United States Patent Office 3,284,623
Patented Nov. 8, 1966

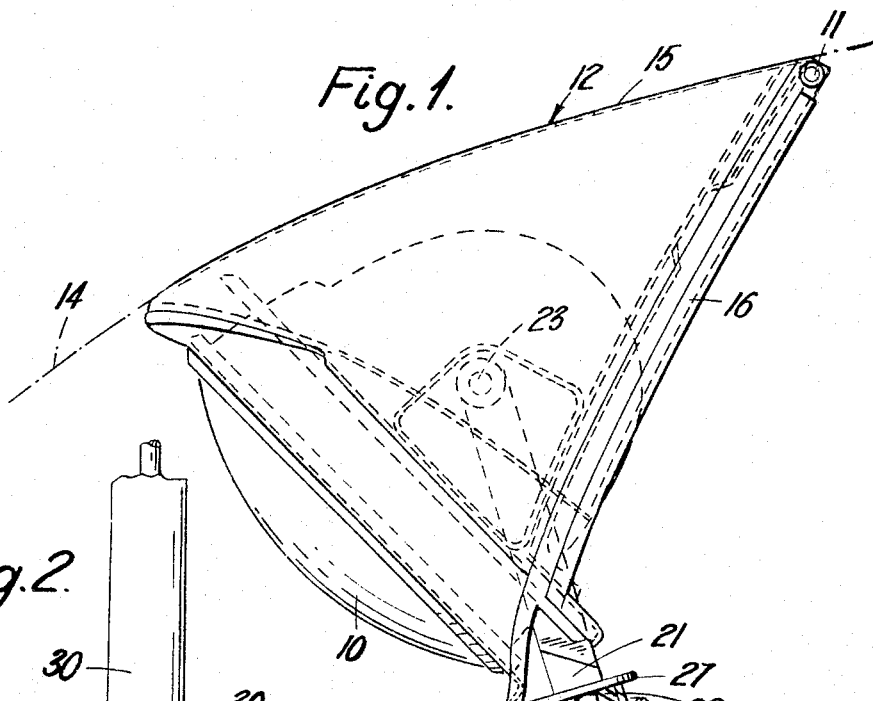
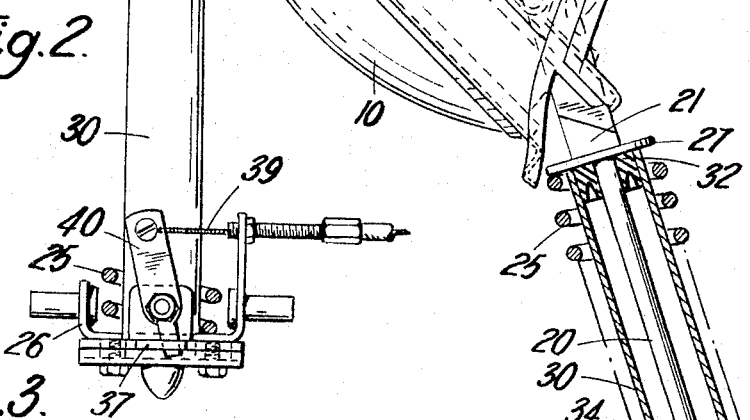
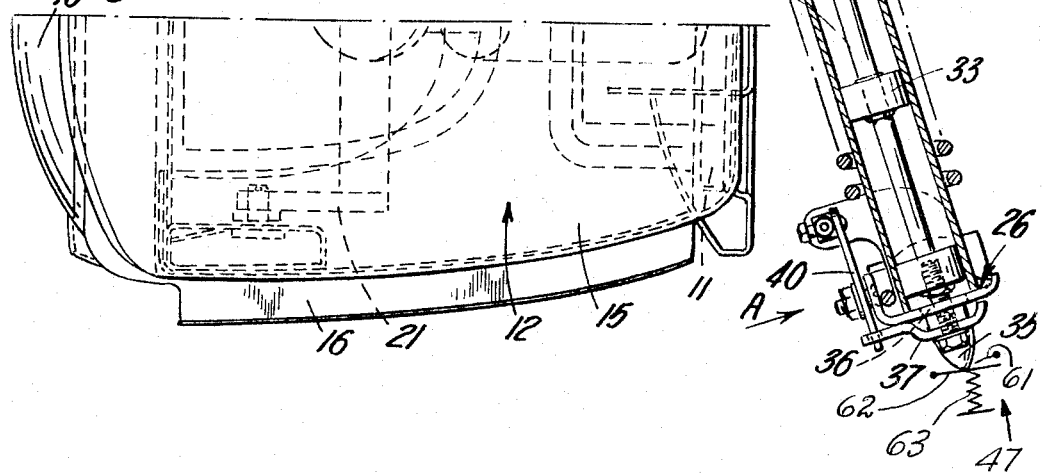

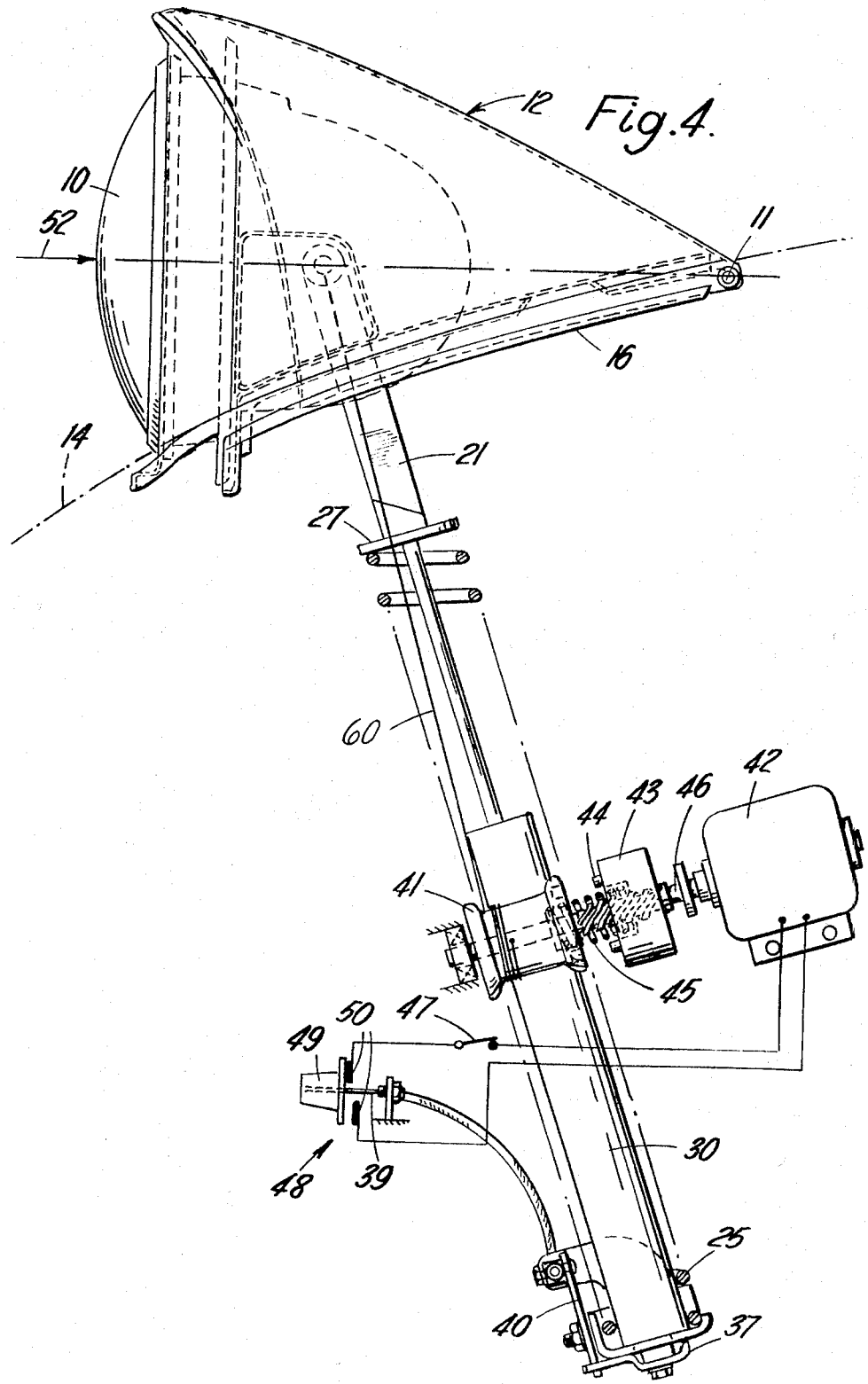

3,284,623
RETRACTABLE VEHICLE HEADLAMP
Philip David Neal, Coventry, England, assignor to Humber Limited, Coventry, Warwickshire, England, a British company
Filed June 29, 1964, Ser. No. 378,739
Claims priority, application Great Britain, July 2, 1963, 26,231/63
1 Claim. (Cl. 240—7.1)

The invention relates to retractable systems and is concerned with retractable headlamp systems for motor vehicles.

The invention provides a motor vehicle having a headlamp pivotally mounted on the vehicle body for pivotal movement between a fully raised position for use and a retracted position in which the headlamp is contained within a recess in the body, a fairing attached to the lamp for movement therewith and arranged to cover the mouth of the recess when the lamp is retracted and having the pivot axis transverse to the vehicle axis and on, or closely adjacent to, the resultant line of action on the headlamp and fairing, when in the raised position, of the air impinging on the headlamp and fairing due to the forward motion of the vehicle.

Preferably the pivot axis will be on or just above the centre line of the headlamp when in the fully raised position.

In a preferred arrangement, the fairing has along each of its lower fore and aft edges, an out-turned lip which engages the underside of the vehicle body around the recess when in the fully raised position, whereby the lamp is positively located relative to the body in its fully raised position.

The headlamp may be moved from its fully retracted to its fully raised position by spring means, and there may further be a damper (e.g. pneumatic) by which the action of the spring means is controlled.

There may also be provided, whereby the headlamp is moved from its fully raised to its fully retracted position, an electric motor driving a pulley carrying a wire or cable attached at its free end to the fairing unit.

There may be latch means to retain the headlamp and fairing in the retracted position.

A disengageable clutch may be provided between the motor and the pulley.

In an alternative arrangement, vacuum or pressure operated means may be provided whereby the headlamp is raised or lowered.

A specific embodiment of a retractable headlamp, according to the invention for use on a motor vehicle, will now be described by way of example and with reference to the accompanying drawings in which:

FIGURE 1 is a side elevation of the headlamp in retracted position, the means for retracting the headlamp being omitted for clarity.

FIGURE 2 is a view in direction of the arrow A in FIGURE 1,

FIGURE 3 is a half plan view of the headlamp and,

FIGURE 4 is a side elevation of the headlamp in its raised position.

The headlamp is one of a pair designed to retract into the body or wing of a motor vehicle and so leave the body contour unencumbered.

The headlamp 10, is mounted within a fairing unit 12 which is, in turn, pivoted at its rearmost edge 11 to the body, whose surface is outlined at 14, to be retractable into the body through a generally rectangular aperture made in the body surface. When in the retracted position, the upper surface 15 of the lamp fairing forms a continuation of the body surface filling the aperture as shown in FIGURE 1.

The fairing has flanges 16 along the base of both side edges, and these compress two strips of resilient material secured along the underside of the two longitudinal sides of the aperture in the body when the lamp approaches the raised position. This interaction is held securely, providing a positive positioning of the headlamp, and preventing a rattling.

There are separate means for raising and lowering the lamp. The raising mechanism is a spring urged rod 20 acting on a stirrup 21 connected at 23 to the fairing sides. The spring 25 acts between a fixed abutment 26 and a collar 27 on the rod and surrounds the barrel 30 of a pneumatic shock absorber.

The rod 20 passes through a seal 32 fixed in the shock absorber barrel, and carries within the barrel a plunger 33. Air is thus trapped within the space 34.

The lower end of the rod 20 carries a tapered bulb 35 which, as the headlamp approaches its fully retracted position passes through a hole 36 in the fixed abutment 26 and pushes aside a spring loaded latch plate 37. When the fully retracted position is reached, the latch plate springs back behind the bulb 35 and latches the rod, and thence the headlight, in that position. To release the rod, a Bowden cable 39 operates a lever 40 which slides the latch plate away from the bulb. When released, the headlamp is lifted to its raised position under the action of the spring 25, the pneumatic damper preventing too rapid a movement jarring the mechanism as it reaches the fully raised position.

The headlamp is retracted, against the spring 25, by a cable 60 attached to the fairing unit and wound on to a pulley 41 driven by an electric motor 42 through a clutch 43. The clutch is of the Bendix type, incorporating a simple dogclutch 44 mounted on a helix 45 on the motor spindle 46, which, when the motor is started, engages to drive the pulley and thus retract the headlamp by a pull on the cable. A limit switch 47 cuts out the electric motor when the headlamp is fully retracted.

The limit switch 47 is illustrated in FIGURES 1 and 4 and comprises a fixed contact 61 and a movable contact 62. The movable contact is held against the contact 61 by a spring 63, but when the headlamp is fully retracted the bulb 35 on the rod 20 pushes the contact 62 away from the contact 61 to break the electrical supply to the motor.

A combined mechanical and electrical control unit 48 is mounted on the vehicle fascia panel. When the headlamps are in their raised position, a twist on the control knob 49 starts the electric motor, which engages the dog-clutch and retracts the headlamp. When the headlamps are in the fully retracted position, a pull on the control pulls on the cable 39 and releases the rod from the latch member allowing the headlamp to rise. The clutch 43 is self-releasing and disengages when the motor 42 is stopped.

Should the headlamp be required suddenly while it is being retracted, the axial pull on the control knob 49 also switches off the electric motor so that the headlamp can be raised again immediately without having to wait until it is fully retracted.

The pivot axis 11 for the headlamp fairing unit is chosen so that at all times the centre of pressure of the air impinging on the fairing due to the vehicle's motion is on, or close to, the pivot axis. Ideally, in the fully raised position, the line of action 52 of the air pressure passes through the line of the pivot axis, so that no turning moment is exerted on the fairing unit to strain the raising or lowering mechanism.

The source of power by which the headlamp is raised or lowered may take alternative forms. For instance a vacuum servo type of operation, taken from the engine manifold may be used.

Should there be an electrical failure in the retracting motor of the embodiment described above, this will not prevent use of the headlamps since they will still rise under the action of the springs 25 when the catches 37 are released. They could also be retracted by pushing down on the fairings by hand, until the latches engage, or alternatively a manual retraction cable could be fitted to each lamp, running from the fairing unit to a position under the fascia, so that the lamps could be retracted by a manual pull on the cable.

I claim:

A motor vehicle having:

(a) a headlamp mounted on the vehicle body for pivotal movement between a raised position for use and a retracted position.

(b) a recess in the vehicle body to receive the headlamp when in its retracted position.

(c) a fairing attached to the lamp for movement therewith and arranged to cover the mouth of the recess when the lamp is retracted.

(d) the pivot axis of the lamp being transverse to the vehicle body and closely adjacent to, the resultant line of action on the headlamp and fairing, when in the raised position, of the air impinging on the headlamp and fairing due to the forward motion of the vehicle.

(e) the fairing having along each of its lower fore and aft edges, an out-turned lip which engages the underside of the vehicle body around the recess when in the fully raised position, whereby the headlamp is positively located relative to the body in its fully raised position.

(f) spring means acting between the body and the headlamp in the direction to move the headlamp from its fully retracted to its fully raised position.

(g) a damper to control the action of the spring means.

(h) latch means on the body and engageable with the headlamp to retain the headlamp and fairing in the retracted position against the action of the spring means.

(i) means operable from inside the vehicle to release the latch means to raise the headlamp, and (j) means operable from inside the vehicle to lower the headlamp against the spring to engage the latch means.

References Cited by the Examiner

UNITED STATES PATENTS

| | | | |
|---|---|---|---|
| 2,119,892 | 6/1938 | Snow | 240—7.1 |
| 2,267,974 | 12/1941 | Harley | 240—7.7 |
| 2,738,492 | 3/1956 | Arneson et al. | 240—7.1 X |
| 2,796,515 | 6/1957 | Waskie | 240—7.1 |
| 3,107,865 | 10/1963 | Hostetter | 240—7.1 |
| 3,189,737 | 6/1965 | Lawless | 240—61.4 X |

NORTON ANSHER, *Primary Examiner.*